(12) United States Patent
Kogej et al.

(10) Patent No.: US 9,541,423 B2
(45) Date of Patent: Jan. 10, 2017

(54) MAGNETIC ENCODER APPARATUS HAVING A PLURALITY OF MAGNETIC SENSOR ELEMENTS

(71) Applicants: RENISHAW PLC, Wotton-under-Edge (GB); RLS MERILNA TEHNIKA D.O.O., Komenda (SI)

(72) Inventors: Peter Kogej, Rozna Dolina (SI); Aljaž Ogrin, Kranj (SI); Gregor Dolšak, Ig (SI); Blaž Hajdinjak, Ljubljana (SI)

(73) Assignees: RENISHAW PLC, Wotton-under-Edge (GB); RLS MERILNA TEHNIKA D.O.O., Komenda (SI)

( * ) Notice: Subject to any disclaimer, the term of this patent is extended or adjusted under 35 U.S.C. 154(b) by 0 days.

(21) Appl. No.: 14/382,629

(22) PCT Filed: Mar. 6, 2013

(86) PCT No.: PCT/GB2013/000090
§ 371 (c)(1),
(2) Date: Sep. 3, 2014

(87) PCT Pub. No.: WO2013/132207
PCT Pub. Date: Sep. 12, 2013

(65) Prior Publication Data
US 2015/0077092 A1    Mar. 19, 2015

(30) Foreign Application Priority Data
Mar. 8, 2012    (GB) .................................. 1204066.3

(51) Int. Cl.
*G01B 7/14*    (2006.01)
*G01B 7/30*    (2006.01)
(Continued)

(52) U.S. Cl.
CPC .............. *G01D 5/12* (2013.01); *G01D 5/2458* (2013.01); *G01D 5/24409* (2013.01)

(58) Field of Classification Search
CPC ..... G01D 5/12; G01D 5/24409; G01D 5/2458
(Continued)

(56) References Cited

U.S. PATENT DOCUMENTS

| 4,595,991 A | 6/1986 | Spies |
| 5,004,982 A | 4/1991 | Chaney et al. |

(Continued)

FOREIGN PATENT DOCUMENTS

| CN | 1194365 A | 9/1998 |
| CN | 102460077 A | 5/2012 |

(Continued)

OTHER PUBLICATIONS

"MIS53 linear magnetic image sensor," RLS, 2011, pp. 1-2.
(Continued)

*Primary Examiner* — Jay Patidar
(74) *Attorney, Agent, or Firm* — Oliff PLC

(57) ABSTRACT

A magnetic encoder apparatus is presented that includes a plurality of magnetic sensor elements (e.g. Hall sensors) for reading an associated magnetic scale that produces a periodically repeating magnetic pattern. The plurality of magnetic sensor elements produce a plurality of sensor signals and an analyzer is provided for analyzing the plurality of sensor signals to provide a measure of the position of the magnetic sensor elements relative to the associated magnetic scale. The analyzer is arranged to use the plurality of sensor signals to assess the period of the periodically repeating magnetic pattern sensed by the plurality of magnetic sensor elements. In this manner, the requirement to carefully match the period of the sensor elements with the periodically repeating magnetic pattern of the associated magnetic scale is avoided.

14 Claims, 4 Drawing Sheets

(51) Int. Cl.
  *G01D 5/12* (2006.01)
  *G01D 5/244* (2006.01)
  *G01D 5/245* (2006.01)
(58) Field of Classification Search
  USPC .................................................. 324/207.2
  See application file for complete search history.

(56) References Cited

U.S. PATENT DOCUMENTS

| | | | |
|---|---|---|---|
| 5,726,445 | A | 3/1998 | Thaler et al. |
| 5,886,352 | A | 3/1999 | Wright et al. |
| 6,054,851 | A | 4/2000 | Masreliez et al. |
| 6,545,262 | B1 | 4/2003 | Burgschat |
| 6,927,705 | B2 | 8/2005 | Isobe |
| 2002/0190710 | A1* | 12/2002 | Steinich ............ G01D 5/24404 324/207.24 |
| 2008/0036454 | A1 | 2/2008 | Landrieve |
| 2011/0218760 | A1 | 9/2011 | Takahama et al. |

FOREIGN PATENT DOCUMENTS

| | | |
|---|---|---|
| DE | 4436784 A1 | 4/1995 |
| EP | 0503716 A1 | 9/1992 |
| WO | WO 02/084223 A1 | 10/2002 |
| WO | WO 2004/094957 A1 | 11/2004 |
| WO | WO 2010/049682 A1 | 5/2010 |
| WO | WO 2010/086582 A2 | 8/2010 |
| WO | WO 2010/086585 A1 | 8/2010 |
| WO | WO 2010/100407 A1 | 9/2010 |
| WO | WO 2010/100409 A1 | 9/2010 |
| WO | WO 2010/139964 A2 | 12/2010 |

OTHER PUBLICATIONS

Jul. 4, 2012 British Search Report issued in Application No. GB1204066.3.

Jun. 10, 2013 International Search Report issued in International Application No. PCT/GB2013/000090.

Jun. 10, 2013 Written Opinion issued in International Application No. PCT/GB2013/000090.

Sep. 22, 2015 Office Action issued in Chinese Patent Application No. 201380012921.3.

* cited by examiner

MAGNETIC ENCODER APPARATUS HAVING A PLURALITY OF MAGNETIC SENSOR ELEMENTS

The present invention relates to magnetic encoder apparatus for measuring the position of a readhead relative to a magnetic scale. In particular, the present invention relates to improved magnetic encoder apparatus in which the need to match the pitch of the magnetic scale to the pitch of the magnetic sensor elements of the readhead is avoided.

Magnetic encoders are known. U.S. Pat. No. 4,595,991 describes encoder apparatus in which a scanning unit comprises multiple scanning elements for reading a measuring scale. The number of scanning elements required per period of scale is based on the bandwidth characteristic of the scanning signals. For example, a preferred embodiment describes providing six scanning elements per period of scale. The scanning signals are subjected to Fourier analysis and a pair of Fourier coefficients that describes the fundamental waveform component of the periodical analogue signals are calculated. These Fourier coefficients are said to provide harmonic-free periodic signals from which incremental position measurements can be determined. Encoders of the type described in U.S. Pat. No. 4,595,991 have the disadvantage that careful matching of the pitch of the magnetic scale to the pitch of the magnetic sensor elements is required.

According to a first aspect of the present invention, there is provided magnetic encoder apparatus that comprises;
 a plurality of magnetic sensor elements for reading an associated magnetic scale that comprises a periodically repeating magnetic pattern, the plurality of magnetic sensor elements producing a plurality of sensor signals, and
 an analyser for analysing the plurality of sensor signals to provide a measure of the position of the magnetic sensor elements relative to the associated magnetic scale,
 wherein the analyser is arranged to use the plurality of sensor signals to assess the period of the periodically repeating magnetic pattern sensed by the plurality of magnetic sensor elements.

The present invention thus provides encoder apparatus comprising a plurality of magnetic sensor elements (e.g. an array of Hall sensors) that each output a sensor signal describing the strength of the magnetic field present at the sensor element. The plurality of magnetic sensor elements can thus be used to read or image an associated magnetic scale that comprises a periodically repeating magnetic pattern (e.g. an array of regions of alternating magnetisation direction). An analyser is also provided for analysing the plurality of sensor signals to provide a measure of the position of the magnetic sensor elements relative to the associated magnetic scale. Instead of assuming a certain (fixed) number of sensor elements per period of the associated magnetic scale, the analyser of the apparatus of the present invention is arranged to use the plurality of sensor signals to assess the period of the periodically repeating magnetic pattern that has been sensed by the plurality of magnetic sensor elements. This assessment may comprise calculating the period of the periodically repeating magnetic pattern and/or determining whether the sensed period differs from the expected period (e.g. due to misalignment of the sensor elements and the scale). Advantageously, the pitch of the periodically repeating magnetic pattern sensed by the plurality of magnetic sensor elements is different to the pitch of magnetic sensor elements. As explained in more detail below, the analyser may use Discrete Fourier transformation based methods to perform such analysis.

Unlike prior art systems of the type described in U.S. Pat. No. 4,595,991, apparatus of the present invention does not require there to be an integer number of magnetic sensor elements per scale period. In other words, the pitch of the magnetic sensor elements does not have to be matched to the pitch of the periodically repeating magnetic pattern of the magnetic scale. It should be noted that the apparatus of the present invention would operate if there were provided an integer number of magnetic sensor elements per scale period, but this is not a requirement. As explained below, the apparatus of the present invention has been found to be especially advantageous for use in rotary encoder systems in which the magnetic scale comprises radially extending magnetic segments and therefore produces a magnetic field with an effective pitch that increases with radius. The tight mounting tolerances previously required to ensure the pitch of the magnetic field pattern matches the pitch of the plurality of magnetic sensor elements are thus avoided.

Advantageously, the analyser assesses the period of the periodically repeating magnetic pattern by determining the number of periods of the periodically repeating magnetic pattern sensed by the plurality of magnetic sensor elements. In other words, the number of periods of the magnetic pattern that occur over the spatial extent of the plurality of sensor elements is found by the analyser from the plurality of sensor signals. Preferably, the number of periods is found to the nearest integer value. For example, it may be established that N periods of the magnetic pattern occur over the length of a linear array of sensor elements, where N is an integer. In other words, the spatial frequency of the repeating magnetic pattern can be found.

The analyser may analyse the plurality of sensor signals using any suitable mathematical technique. The analyser may comprise a processor for implementing the required technique. Advantageously, the analyser performs Fourier analysis on the plurality of sensor signals. The Fourier analysis preferably comprises the use of one or more discrete Fourier transforms. The Fourier analysis preferably assesses the period of the periodically repeating magnetic pattern sensed by the plurality of magnetic sensor elements. In particular, performing Fourier analysis on the plurality of sensor signals preferably allows the calculation of the amplitude of a fundamental sinusoidal component and/or one or more harmonics The spatially varying magnetic field sensed by the plurality of sensors and output to the analyser via the plurality of sensor signals may thus be analysed using a Fourier based technique. The Fourier based technique can be used to describe the spatially varying magnetic pattern sensed by the sensor elements in terms of a fundamental (sinusoidal) component and higher order harmonics of that fundamental component. For example, Fourier analysis may be performed using a fundamental sinusoidal component having a spatial period substantially equal to the spatial extent of the plurality of sensor elements. The fundamental component would then describe a magnetic pattern having a period equal to the spatial extent of the plurality of sensor element. For example, if the sensor elements are provided in a linear array the fundamental sinusoidal component may have a period substantially equal to the length of the linear array. In such an example, the first harmonic (H1) would correspond to two periods of a magnetic pattern over the spatial extent of the plurality of sensor elements, the second harmonic (H2) to three periods, the third harmonic (H3) to four periods etc. It would, of course, be possible to define a fundamental component having any desired spatial frequency and the spatial frequency is only matched to the spatial extent of the plurality of sensor elements for convenience.

The analyser may monitor the amplitude of the fundamental sinusoidal component or any one or more of the harmonics. A change in amplitude of the fundamental sinusoidal component or any one or more of the harmonics may be used to indicate that there has been a change in the period of the periodically repeating magnetic pattern sensed by the plurality of magnetic sensor elements. In other words, the analyser may assess the period of the periodically repeating magnetic pattern sensed by the plurality of magnetic sensor elements by measuring the amplitude of the fundamental sinusoidal component or of any one or more of the harmonics.

In a preferred embodiment, the analyser performs Fourier analysis on the plurality of sensor signals to calculate the relative amplitude of a plurality of the harmonics. The relative amplitude of the different harmonics may then provide an indication of the alignment of the plurality of sensor elements relative to the scale. For example, eight periods of a magnetic pattern may be formed over the spatial extent of the plurality of sensor elements when the sensor elements are correctly aligned relative to the scale. In such an example, the amplitude of the seventh harmonic (H7) would be substantially greater than the amplitude of other harmonics (H5, H6, H8, H9 etc). If any misalignment occurred, the amplitude of the H7 component would reduce and the amplitude of other components would increase. In particular, the amplitude of one of the neighbouring harmonics (e.g. H6 or H8) would increase. Monitoring the relative amplitude of a plurality of the harmonics (e.g. the H6/H7 and H7/H8 amplitude ratios) thus allows the period of the periodically repeating magnetic pattern to be assessed. There can then be a correction applied (e.g. a recalculation of the period of the periodically repeating magnetic pattern to be used in the Fourier analysis) or mechanical realignment of the sensor elements and associated scale.

The apparatus of the present invention may be used to read a magnetic scale that encodes only incremental position information. In particular, the analyser may be used to extract phase information from the plurality of sensor signals. This phase information may be used to calculate any incremental movement of the plurality of magnetic sensor elements relative to the magnetic scale. For example, the analyser may generate phase quadrature signals (e.g. sine and cosine signals) that can be analysed (e.g. interpolated) to extract incremental position information. The analyser may perform such interpolation to provide incremental position data or it may just output one or more signals (e.g. phase quadrature signals) for interpolation. If the analyser analyses the plurality of sensor signals using a Fourier technique, at least one Fourier coefficient may be calculated that describes the phase of the periodically repeating magnetic pattern sensed by the plurality of magnetic sensor elements. The at least one Fourier coefficient calculated by the analyser may be used to calculate the incremental position information, such as phase quadrature signals, that describe any change in relative position of the magnetic sensor elements and the magnetic scale.

The apparatus of the present invention is preferably used to read an associated magnetic scale that also encodes absolute position information. For example, the associated magnetic scale may comprise, as part of the periodically repeating magnetic pattern, certain scale marking having different magnetic strengths that are used to encode different data bits. The analyser may thus be arranged to calculate the phase of the periodically repeating magnetic pattern and to determine, for each period of the pattern, the strength of the magnetic pattern sensed by the plurality of magnetic sensor elements at a predetermined phase angle. The strength of the magnetic field at certain points along the magnetic scale can thus be established, thereby allowing the relevant data bits to be extracted. In a preferred embodiment, the magnetic field strength of the plurality of signals may be found at a phase angle that corresponds to the amplitude maxima of the magnetic pattern. In other words, the analyser may establish the period and pitch of the magnetic field pattern and thereby determined the location of the peaks (maxima) in magnetic field that are associated with the centre of each first magnetised regions. The magnetic field strength at each maxima may then be analysed (e.g. compared to a threshold) to determine the pattern encoded in the magnetic scale and thereby extract the encoded data bits.

The plurality of magnetic sensor elements are conveniently arranged to read an associated magnetic scale comprising a series of alternating first magnetised regions and second magnetised regions. Absolute data is preferably encoded in the magnetic scale by providing first magnetised regions of at least a first type (e.g. a first width) and a second type (e.g. a second width) that generate different magnetic field strengths. Further details of suitable magnetic scale are outlined below. Advantageously, the predetermined phase angle used by the analyser allows the magnetic field strength of each first magnetised region to be assessed. This preferably enables the analyser to determine the presence of a first magnetised region of a first type or a second type. The values of the encoded data bits can thus be extracted by the analyser.

Advantageously, the plurality of magnetic sensor elements are arranged to simultaneously read a plurality of first magnetised regions of an associated scale. The analyser may also be arranged to determine a plurality of data bits (i.e. from the first magnetised regions that have been read) that form a codeword. The codeword may encode information about the absolute position of the plurality of magnetic sensor elements relative to the associated scale.

The apparatus may also include the magnetic scale. As described above, the magnetic scale preferably comprises a series of alternating first magnetised regions and second magnetised regions. In other words, the first and second magnetised regions preferably alternate with one another. The first and second magnetised regions may be magnetised in different directions. Advantageously, the first magnetised regions are of the opposite magnetic pole to the second magnetised regions. For example, the first magnetised regions may comprise north poles (N) and the second magnetised regions may comprise south poles (S), or vice versa. In this manner, a periodically repeating magnetic field pattern is generated that can be measured by the magnetic sensor elements and used to generate incremental position information.

Preferably, the centres of the first magnetised regions are spaced apart from one another by a fixed interval. The fixed interval may comprise a fixed distance interval in the case of a linear scale or a fixed angular interval in the case of radial scale. The magnetic scale may encode data bits by including first magnetised regions of at least a first type and a second type. The first type and second type of first magnetised region may generate different magnetic field strengths. The magnetic field strength associated with each first magnetised region may thus be used to extract encoded position information.

The first and second type of first magnetised region may be the same physical size but magnetized differently. Advantageously, the first magnetised regions of the first type comprise magnetised regions of a first width. Preferably, first magnetised regions of the second type comprise magnetised regions of a second width. In this example, the first width is different to the second width. Varying the width (rather than controlling the strength of material magnetisation) is preferred because it is much easier to magnetise the scale material to saturation and control the size of the magnetised marking compared with partially magnetising parts of the material. First magnetised regions of the first type (e.g. of a first width) may generate a magnetic field of a first strength and thereby encode a first data bit value. First magnetised regions of the second type (e.g. of a second width) may generate a magnetic field of a second strength and thereby encode a second data bit value. In this manner, the width of the first magnetised region encodes a data bit, the data bit taking a first value if the first magnetised region has a first width and a second value if the first magnetised region has a second width. As explained above, the analyser may assess the magnetic field strength of each first magnetised region to determine the presence of a first magnetised region of a first type (e.g. first width) or a second type (e.g. second width).

Although the examples provided herein describe binary (base-2) systems (e.g. the first and second data bit values can be defined as a "0" or a "1") it should be noted that the first magnetised regions may be provided as three or more different types to encode information in a number system of a higher base.

The magnetic scale preferably comprises linear magnetic scale comprising a linear array of alternating first magnetised regions and second magnetised regions. The first and second magnetised regions of the scale are preferably rectangular segments.

The magnetic scale may comprise a radial magnetic scale comprising a series of radially extending first magnetised regions and second magnetised regions. In other words, the magnetic scale may be provided as a disk or ring having the first and second magnetised regions formed on or in its surface. The magnetised regions may be substantially wedge shaped. Advantageously, the centres of the first magnetised regions are located at substantially constant angular intervals.

The plurality of magnetic sensor elements are preferably provided as a linear array. The linear axis of the linear array may be aligned with the long axis of the scale. Assuming such alignment is adequately maintained, the pitch of the magnetic pattern will be substantially invariant along the length of the linear array of magnetic sensor elements. If, however, such a linear array of magnetic sensor elements is used to read a radial scale then the pitch of the magnetic field pattern generated by the magnetic scale will vary as a function of the radial location of the linear array and may also vary (especially for scales of smaller radius) along the length of the array. As explained above, the analyser is preferably arranged to use the plurality of sensor signals to calculate the period of the periodically repeating magnetic pattern sensed by the plurality of magnetic sensor elements. This allows the linear array of magnetic sensor elements to be placed at different radial locations because the period of the periodically repeating magnetic pattern can be established. In addition, the analyser may also apply a compensation factor or weighing to the sensor signals to compensate for the radial distribution of the first and second magnetised regions.

The plurality of magnetic sensor elements preferably comprise an array of Hall sensor elements. The Hall sensor elements may be arranged to measure the component of magnetic field perpendicular to the surface of the substrate. The spacing between the magnetic sensor elements is preferably known. The plurality of magnetic sensor elements (e.g. Hall sensor elements) are preferably equidistantly spaced apart from one another. The plurality of magnetic sensor elements may be provided on a common substrate (e.g. on a chip). Preferably, at least four sensor elements are provided per scale period (although there is no need for this to be an integer value).

The apparatus may be configured in any suitable way. For example, the plurality of magnetic sensor elements may be provided within a readhead. The readhead may also include the analyser. The analyser may comprise a micro-processor. The analyser may be provided on the same chip or substrate as the magnetic sensor elements. Alternatively, the analyser may be provided in a separate interface. The interface may be connected to the readhead by an interface cable.

The present invention will now be described, by way of example only, with reference to the accompanying drawings in which;

FIG. 1 shows an encoder readhead and a radial magnetic scale,

FIG. 2 shows the encoder readhead of FIG. 1 with a cut-away view through the radial magnetic scale, FIG. 3 shows an encoder readhead and a linear magnetic scale, FIG. 4 shows a cross-section view of the linear magnetic scale of FIG. 3, FIG. 5 shows the magnetic field profile generated by the linear magnetic scale of FIG. 3, FIG. 6 shows the magnetic field strength measured by the encoder readhead when placed over a part of the linear magnetic scale of FIG. 3, FIG. 7 illustrates how the period of the magnetic pattern shown in FIG. 6 can be determined using Fourier analysis, FIG. 8 shows how absolute data encoded in the magnetic scale can be extracted, and FIGS. 9a to 9c show the change in relative amplitudes of Fourier components arising from misalignment of a radial scale.

Referring to FIGS. 1 and 2, angular encoder apparatus of the present invention is illustrated. The apparatus include a readhead 2 and a radial magnetic scale 4 attached to a steel ring 5. The readhead 2 comprises a sensor chip 6 comprising a linear array of fifty-three Hall sensor elements. Processing electronics 7 are also provided on the readhead. The radial magnetic scale 4 comprises alternating regions that are magnetised in different directions; these will be termed North pole (N) and South pole (S) regions. As explained in more detail below, the centres of the North pole regions are equidistantly spaced apart from one another and the magnetic scale thus provides a periodically varying magnetic field profile that can be analysed to provide incremental position data. The North pole regions are also provided in two different widths to allow absolute position data to be encoded. A first width encodes a logical "0" and a second width encodes a logical "1". In this manner, both incremental and absolute position information can be encoded in, and extracted from, the magnetic scale.

FIG. 3 shows angular encoder apparatus of the present invention that includes the readhead 2 and a linear magnetic scale 10.

FIG. 4 shows a cross-section of a part of the linear magnetic scale 10. The scale 10 comprises a rubber magnetic band 12 supported by a steel substrate 14. The up-arrows 16 and down-arrows 18 indicate the direction of magnetization of the alternating regions of the band 12. For convenience, the differently magnetised regions will be referred to herein as the North pole (N) and South pole (S) regions. The magnetized regions are of different widths, but the distance between the centres of neighbouring North pole regions is the substantially constant distance P. Additionally, the North pole regions are provided in two widths, namely narrow regions 20 of width $L_0$ and wide regions 22 of width $L_1$. The narrow regions 20 indicate the state of logical "0", whilst the wide regions 22 indicate a logical "1". The widths of the South pole regions comply with the requirement to provide a substantially constant distance between two neighbouring centres of the North pole regions.

Referring to FIG. 5, the normal component of magnetic field density $B_n$ in Tesla is shown at a distance of 0.3 mm above a length of linear scale is shown. In this example the distance (P) between the centres of neighbouring North pole regions is 0.9 mm. The different magnetic field strength associated with the different widths of North pole region can be seen from the different heights of the maxima as shown in the figure.

FIG. 6 shows the magnetic field strength as measured by the fifty-three Hall sensors of the above described readhead 2 when placed above a section of linear magnetic scale.

FIG. 7 shows the sinusoidally varying component 60 of the magnetic field pattern calculated from the magnetic field strength using a Discrete Fourier transformation based process. In particular, the amplitude and phase of the sinusoidally varying component 60 of the periodically repeating signal 62 is calculated as will be explained in more detail below.

In this example, there are found to be 8 periods of the magnetic field pattern spatially distributed across the fifty-three Hall sensors of the readhead. There are thus 6.625 sensors provided per period of the magnetic pattern. In terms of Fourier analysis, the magnetic pattern of eight periods that covers the length of the array of Hall sensors can be termed the seventh harmonic (H7) of the fundamental sine wave; the fundamental sine wave comprising a single period over the array of Hall sensors.

The amplitude and phase of the signal that corresponds to the magnetic pattern can thus be calculated by the expressions:

$$S_{SIN} = \sum_{i=0}^{52} S_i \cdot \operatorname{Sin}\left(\frac{i \cdot 2\pi \cdot 8}{53}\right) \quad (1a)$$

$$S_{COS} = \sum_{i=0}^{52} S_i \cdot \operatorname{Cos}\left(\frac{i \cdot 2\pi \cdot 8}{53}\right) \quad (1b)$$

where $S_i$ is the sensor signal produced by the $i^{th}$ Hall sensors. The coefficients $$\operatorname{Sin}\left(\frac{i \cdot 2\pi \cdot 8}{53}\right) \text{ and } \operatorname{Cos}\left(\frac{i \cdot 2\pi \cdot 8}{53}\right)$$

can be calculated in advance, so can be written as constants $ks_i$ and $kc_i$. The $S_{SIN}$ and $S_{COS}$ expressions thus become:

$$S_{SIN} = \sum_{i=0}^{52} ks_i \cdot S_i \quad (2a)$$

$$S_{COS} = \sum_{i=0}^{52} kc_i \cdot S_i. \quad (2b)$$

Amplitude and phase can then be found using the following equations:

$$\text{Amplitude} = \sqrt{S_{SIN}^2 + S_{COS}^2} \quad (3)$$

$$\text{Phase} = \operatorname{ArcTan}\left(\frac{S_{SIN}}{S_{COS}}\right) \quad (4)$$

FIG. 8 illustrates how, once the period and phase of the fundamental component 60 has been found, the strength of the sensed magnetic field 62 at each maxima of the fundamental component 60 can be extracted. The magnitude of each maxima in the sensed magnetic field 62 is related to the width of each North pole region of the scale 10. As shown in FIG. 8, narrow North pole regions produce a low maxima 70 whilst the wide North pole regions produce a higher maxima 72.

The data in FIG. 8 can then be decoded. In this example, the code word extracted is "00111111". This code word is then found in a Look-up table (LUT) and converted into a coarse absolute position. The phase information from equation 4 can also be analysed to provide a fine position that is added to the coarse position. An accurate absolute positional measurement can then be generated.

FIG. 9a illustrates an output from Fourier analysis of a periodically repeating signal 62 of the type shown in FIG. 7. In particular, the amplitude of the fundamental and the first nineteen harmonics thereof are plotted. It can be seen that the seventh harmonic (H7) has the highest amplitude. This H7 signal is also the signal 60 shown in FIG. 7 that is used in the calculation of the Sine and Cosine signals from which incremental positions are calculated.

If the readhead is reading an annular scale, then the period of the sensed magnetic pattern will alter as the readhead is moved radially back and forth relative to the scale ring.

Figure 1:
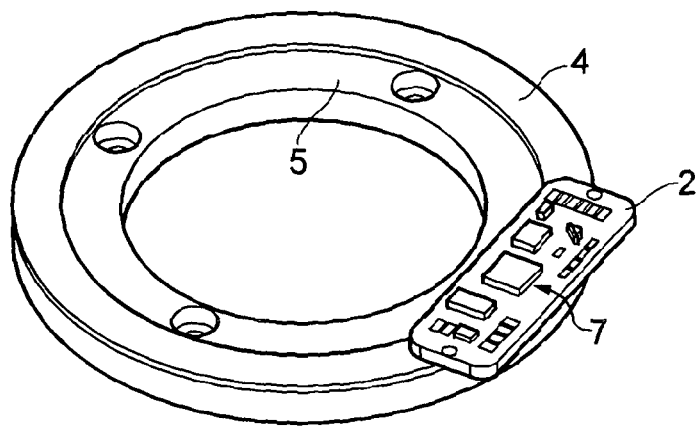
Figure 2:
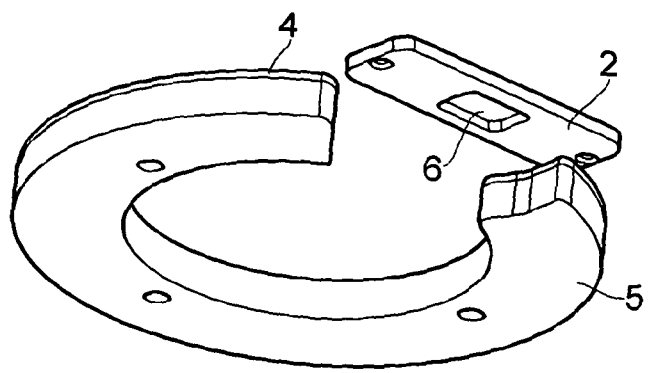
Figure 3:
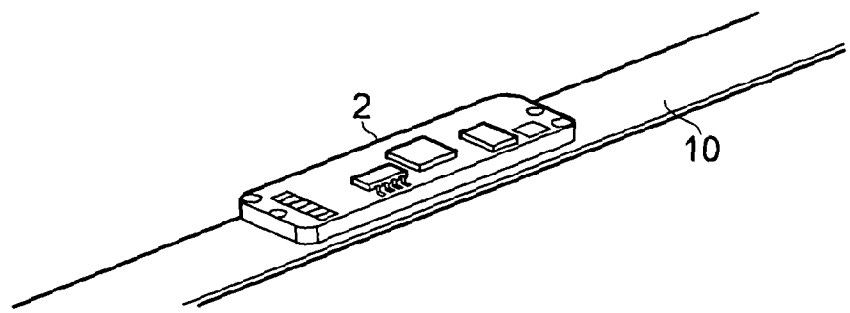
Figure 4:
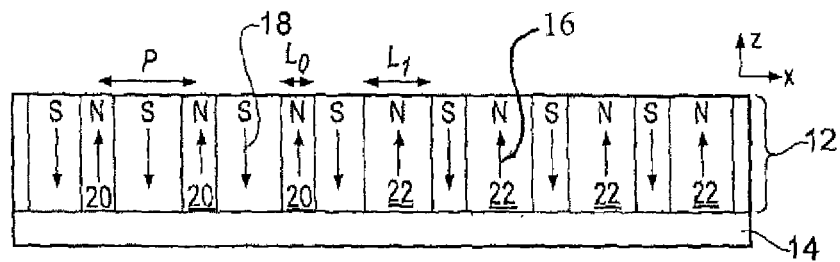
Figure 5:
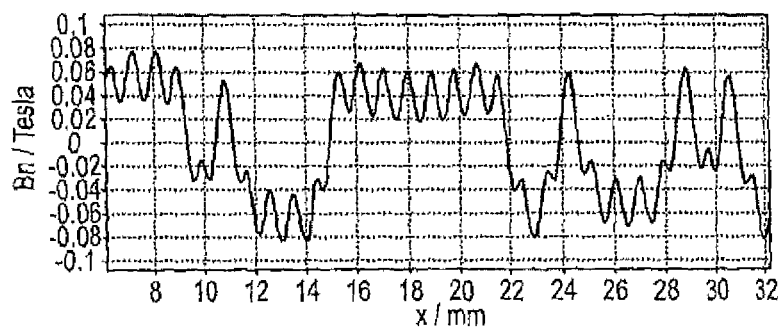
Figure 6:
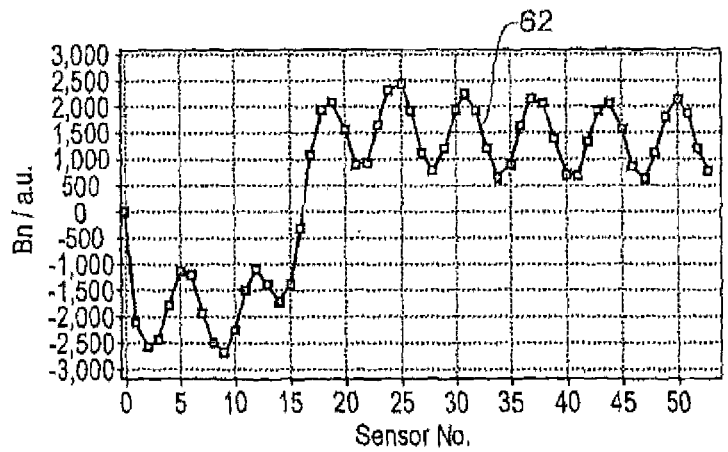
Figure 7:
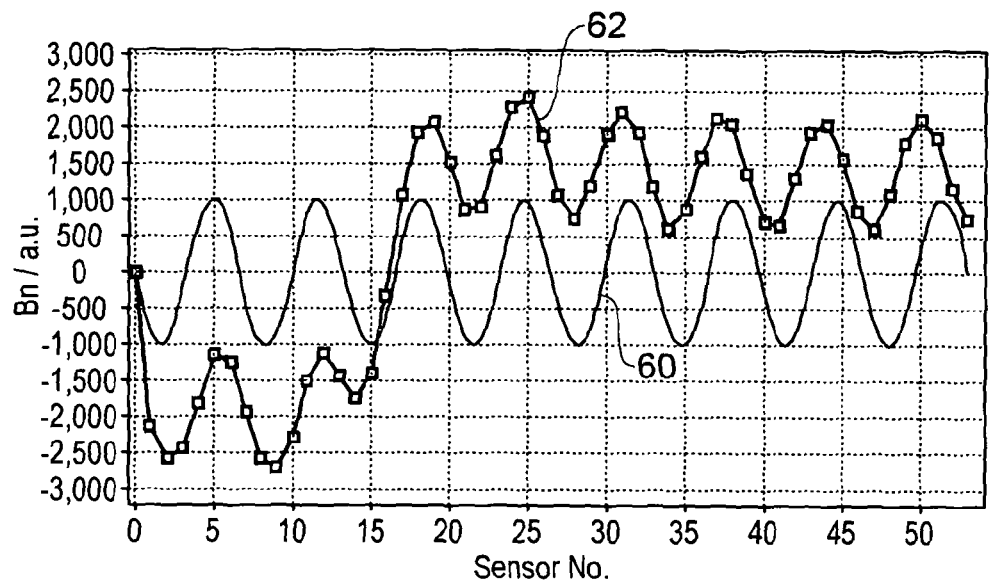
Figure 8:
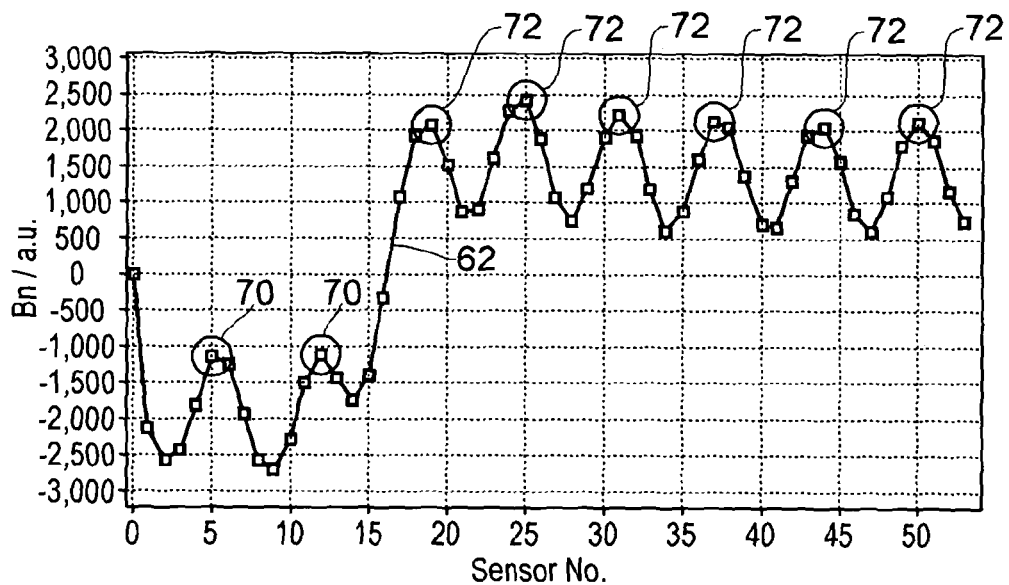
Figure 9A:
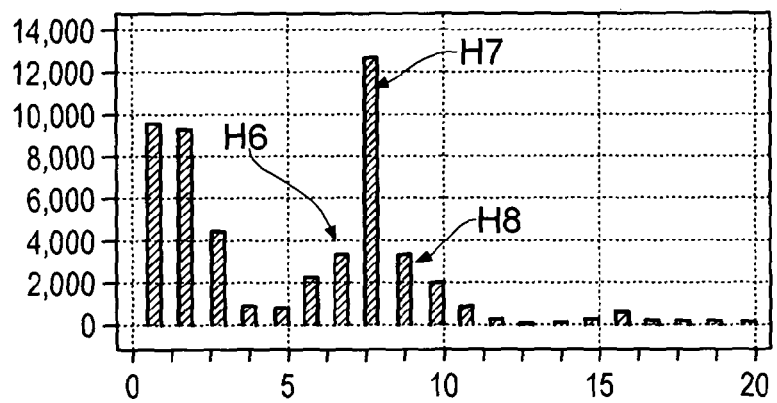
FIG. 9b shows the effect of moving the readhead radially inwards (i.e. towards the centre of the scale ring). In this example, the magnetic period sensed by the readhead reduces (i.e. there are more periods falling across the 53 Hall sensors) and hence the amplitude of the eighth harmonic component (H8) increases whilst the amplitudes of H6 and H7 decrease.
FIG. 9c shows the effect of moving the readhead radially outwards (i.e. away from the centre of the scale ring). In this example, the magnetic period sensed by the readhead increases (i.e. there are fewer periods falling across the 53 Hall sensors) and hence the amplitude of the sixth harmonic component (H6) increases whilst the amplitudes of H7 and H8 decrease.
Figure 9B:
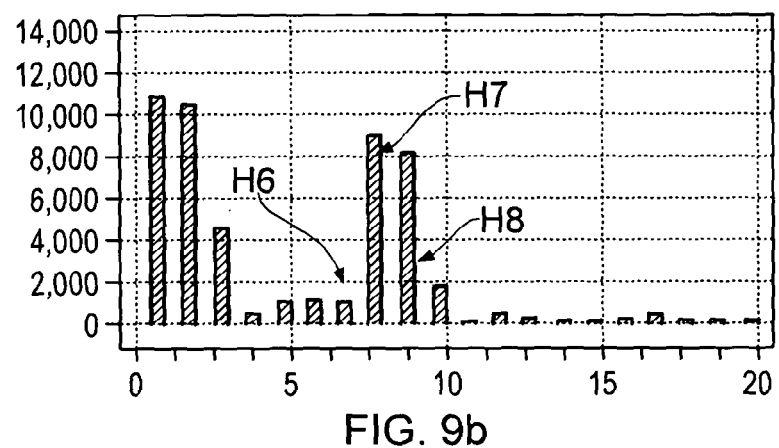
Figure 9C:
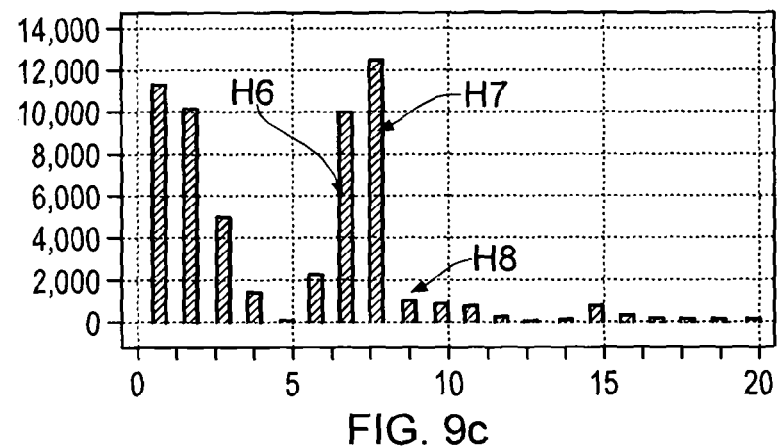

It can thus be seen that readhead alignment relative to the scale can be measured by observing the H7/H6 and H7/H8 ratios. In particular, the readhead can be moved radially back and forth until the amplitude of the H7 signal is maximised so that the desired eight periods of the magnetic field pattern spatial distributed across the fifty-three Hall sensors of the readhead. Such correct alignment then ensures that the Sin and Cosine signals generated from the H7 signal provide reliable incremental position information.

It should be noted that, instead of physically moving the readhead, it would also be possible to recalculate the number of periods of the magnetic pattern sensed by the Hall array and adjust the coefficients used in equations 1a, 1b and 2 accordingly. Furthermore, it should be remembered there is also no need to provide an integer number of periods of the magnetic pattern over the length of the Hall sensor array.

It has also been found that using a linear array of Hall sensors to read a radial scale produces radial distortions in the waveforms at the ends of the array.

It has been found that the $ks_i$ and $kc_i$ coefficients used to generate the Sine and Cosine signals can be modified in order to compensate for the radial distortion. In particular, modified $ks'_i$ and $kc'_i$ coefficients can be calculated taking into account the radial distribution of the first and second magnetic regions using the expressions:

$$ks'_i = \operatorname{Sin}\left(\frac{2\pi \cdot r}{P} \cdot \operatorname{ArcTan}\left(\frac{x_i}{r}\right)\right) \quad (5a)$$

$$kc'_i = \operatorname{Cos}\left(\frac{2\pi \cdot r}{P} \cdot \operatorname{ArcTan}\left(\frac{x_i}{r}\right)\right) \quad (5b)$$

where P is the period of the scale, r is the radius of the ideal position of the readhead and $x_i$ the distance of the $i^{th}$ sensor from the centre of the chip. In the present example, the Hall sensors are spaced 0.15 mm apart from one another and $x_i=(i-26)*0.15$ mm (where 26 is the index of the central sensor on the chip and i ranges from 0 to 52). The values of $ks'_i$ and $kc'_i$ can be calculated in advance.

Taking the corrections of equations 5a and 5b into account the Sine and Cosine expressions become;

$$S_{SIN} = \sum_{i=0}^{52} ks'_i \cdot S_i \quad (6a)$$

$$S_{COS} = \sum_{i=0}^{52} kc'_i \cdot S_i. \quad (6b)$$

Additionally, applying a so-called window function (using $w_i$ coefficients) to equations 6a and 6b can further improve the amplitude and phase information thereby reducing the error when interpolating those signals.

$$S_{SIN} = \sum_{i=0}^{52} w_i \cdot ks'_i \cdot S_i \quad (7a)$$

$$S_{COS} = \sum_{i=0}^{52} w_i \cdot kc'_i \cdot S_i \quad (7b)$$

There are numerous window functions that could be applied; for example, Hann, Gauss, Triangular, Hamming functions etc.

The values of $w_i$ can be calculated in advance as well so both coefficients $w_i$ and $kc_i$ (for linear scale) or $w_i$ and $kc'_i$ coefficients (for angular scale) can be merged into one series of coefficents $w'_i$. Equations 3 and 4 provided above can then be used to generate corrected amplitude and phase information.

The skilled person would appreciate that the above examples describe specific ways of implementing the invention and that various alternatives would be possible.

The invention claimed is:

1. Magnetic encoder apparatus comprising:
   a plurality of magnetic sensor elements for reading an associated magnetic scale that produces a periodically repeating magnetic pattern, the plurality of magnetic sensor elements producing a plurality of sensor signals;
   an analyser for analyzing the plurality of sensor signals to provide a measure of the position of the magnetic sensor elements relative to the associated magnetic scale;
   the analyser being arranged to use the plurality of sensor signals to assess the period of the periodically repeating magnetic pattern sensed by the plurality of magnetic sensor elements; and
   the magnetic scale having a series of alternating firs magnetized regions and second magnetized regions, wherein:
   the first magnetized regions are of the opposite magnetic pole to the second magnetized regions,
   centers of the first magnetized regions are spaced apart from one another by a fixed interval such that a distance between neighboring centers of each of the first magnetized regions is the same, and
   each first magnetized region has a first width or a second different width and thereby encodes a data bit, the data bit taking a first value if the first magnetized region has the first width and a different second value if the first magnetized region has the second width.

2. An apparatus according to claim 1, wherein the analyser assesses the period of the periodically repeating magnetic pattern by determining the number of periods of the periodically repeating magnetic pattern sensed by the plurality of magnetic sensor elements.

3. An apparatus according to claim 1, wherein the analyser assesses the period of the periodically repeating magnetic pattern sensed by the plurality of magnetic sensor elements by performing Fourier analysis on the plurality of sensor signals to calculate the amplitude of a fundamental sinusoidal component and/or one or more harmonics thereof.

4. An apparatus according to claim 3, wherein the analyser performs Fourier analysis on the plurality of sensor signals to calculate relative amplitude of a plurality of harmonics, the relative amplitude providing an indication of an alignment of the plurality of sensor elements relative to the scale.

5. An apparatus according to claim 1, wherein the analyser calculates at least one Fourier coefficient from which incremental position information is calculated that describes any change in the relative position of the magnetic sensor elements and the magnetic scale.

6. An apparatus according to claim 1, wherein the analyser is arranged to calculate the phase of the periodically repeating magnetic pattern sensed by the plurality of magnetic sensor elements and to determine, for each period of the of the periodically repeating magnetic pattern, the strength of the magnetic pattern sensed by the plurality of magnetic sensor elements at a predetermined phase angle.

7. An apparatus according to claim 6, wherein the plurality of magnetic sensor elements are arranged to read the associated magnetic scale comprising a series of alternating the first magnetized regions and the second magnetized regions in which absolute data is encoded by providing first magnetized regions of at least a first type and a second type that generate different magnetic field strengths, wherein the predetermined phase angle allows the magnetic field strength to be assessed to determine if each first magnetized region is of a first type or a second type and thereby extract the value of the encoded data bit.

8. An apparatus according to claim 7, wherein the plurality of magnetic sensor elements are arranged to simultaneously read a plurality of first magnetized regions of an associated scale and the analyser is arranged to determine a plurality of data bits that form a codeword, the codeword encoding information about an absolute position of the plurality of magnetic sensor elements relative to the associated scale.

9. An apparatus according to claim 1, wherein the magnetic scale is a linear magnetic scale comprising a linear array of alternating the first magnetized regions and the second magnetized regions.

10. An apparatus according to claim 1, wherein the magnetic scale is a radial magnetic scale comprising a series of radially extending the first magnetized regions and the second magnetized regions.

11. An apparatus according to claim 10, wherein the plurality of magnetic sensor elements used to read the radial magnetic scale are provided as a linear array and the analyser applies a compensation to the sensor signals to compensate for the radial distribution of the first and second magnetized regions.

12. An apparatus according to claim 1, wherein the pitch of the periodically repeating magnetic pattern sensed by the plurality of magnetic sensor elements is different to the pitch of magnetic sensor elements.

13. An apparatus according to claim 1, wherein the plurality of magnetic sensor elements comprises a linear array of Hall sensor elements.

14. An apparatus according to claim 1, wherein the plurality of magnetic sensor elements and the analyser are provided within a readhead.

\* \* \* \* \*